US012625450B2

(12) United States Patent
Kotani et al.

(10) Patent No.: US 12,625,450 B2
(45) Date of Patent: May 12, 2026

(54) IMAGE FORMING APPARATUS CAPABLE OF IMPROVING ADJUSTMENT ACCURACY OF TONER IMAGE FORMING CONDITION, AND IMAGE DENSITY ADJUSTMENT METHOD

(71) Applicant: KYOCERA Document Solutions Inc., Osaka (JP)

(72) Inventors: Yukiko Kotani, Osaka (JP); Makoto Matsumoto, Osaka (JP); Masaru Watanabe, Osaka (JP); Yasuaki Sakamoto, Osaka (JP); Ayato Morikami, Osaka (JP); Atsuki Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/913,357

(22) Filed: Oct. 11, 2024

(65) Prior Publication Data

US 2025/0123583 A1 Apr. 17, 2025

(30) Foreign Application Priority Data

Oct. 13, 2023 (JP) ................................ 2023-177561

(51) Int. Cl.
*G03G 15/00* (2006.01)
*G03G 15/043* (2006.01)
(Continued)

(52) U.S. Cl.
CPC ....... *G03G 15/5054* (2013.01); *G03G 15/043* (2013.01); *G03G 15/0907* (2013.01);
(Continued)

(58) Field of Classification Search
CPC ............ G03G 15/043; G03G 15/0849; G03G 15/0907; G03G 15/5037; G03G 15/5041;
(Continued)

(56) References Cited

U.S. PATENT DOCUMENTS

2006/0018674 A1* 1/2006 Hirata ................ G03G 15/5058 399/49
2008/0253793 A1* 10/2008 Ishibashi ............ G03G 15/0131 399/74
(Continued)

FOREIGN PATENT DOCUMENTS

JP 2008242083 A 10/2008

*Primary Examiner* — Carla J Therrien
(74) *Attorney, Agent, or Firm* — Alleman Hall LLP

(57) ABSTRACT

An image forming apparatus includes a second acquisition processing portion and a third acquisition processing portion. The second acquisition processing portion acquires a first toner image forming condition of a toner image forming portion. The third acquisition processing portion acquires, based on the first toner image forming condition acquired by the second acquisition processing portion, a relational expression that indicates a relationship between a second toner image forming condition of the toner image forming portion and a toner concentration of a specific toner image that is formed by the toner image forming portion. Further, the third acquisition processing portion uses specific expressions that respectively correspond to a plurality of coefficients included in the relational expression to calculate the plurality of coefficients corresponding to the first toner image forming condition acquired by the second acquisition processing portion.

4 Claims, 8 Drawing Sheets

(51) Int. Cl.
*G03G 15/08* (2006.01)
*G03G 15/09* (2006.01)

(52) U.S. Cl.
CPC ....... *G03G 15/556* (2013.01); *G03G 15/0849* (2013.01); *G03G 15/5037* (2013.01); *G03G 2215/00059* (2013.01)

(58) Field of Classification Search
CPC ........... G03G 15/5054; G03G 15/5058; G03G 15/5062; G03G 15/55; G03G 15/556; G03G 2215/00033–00059
See application file for complete search history.

(56) References Cited

U.S. PATENT DOCUMENTS

| | | | | |
|---|---|---|---|---|
| 2011/0044708 | A1* | 2/2011 | Kusakabe .......... | G03G 15/5058 399/49 |
| 2011/0229820 | A1* | 9/2011 | Higa .................. | G03G 15/0131 399/31 |
| 2024/0103399 | A1* | 3/2024 | Morikami .......... | G03G 15/0855 |

* cited by examiner

FIG.6

| TONER CHARGE AMOUNT | FIRST RELATIONAL EXPRESSION INDICATING RELATIONSHIP BETWEEN TONER CONCENTRATION OF ADJUSTMENT TONER IMAGE (X) AND DC COMPONENT OF DEVELOPING BIAS VOLTAGE (Y) |
|---|---|
| ⋮ | ⋮ |
| Q1 | $Y = a_1X^3 + b_1X^2 + c_1X + d_1$ |
| ⋮ | ⋮ |
| Q2 | $Y = a_2X^3 + b_2X^2 + c_2X + d_2$ |
| ⋮ | ⋮ |
| Q3 | $Y = a_3X^3 + b_3X^2 + c_3X + d_3$ |
| ⋮ | ⋮ |

IMAGE FORMING APPARATUS CAPABLE OF IMPROVING ADJUSTMENT ACCURACY OF TONER IMAGE FORMING CONDITION, AND IMAGE DENSITY ADJUSTMENT METHOD

INCORPORATION BY REFERENCE

This application is based upon and claims the benefit of priority from the corresponding Japanese Patent Application No. 2023-177561 filed on Oct. 13, 2023, the entire contents of which are incorporated herein by reference.

BACKGROUND

The present disclosure relates to an image forming apparatus that uses electrophotography and an image density adjustment method.

An image forming apparatus that uses electrophotography includes a toner image forming portion which forms a toner image on an image-carrying member such as a photoconductor drum. The toner image forming portion includes a developing roller which develops an electrostatic latent image formed on the image-carrying member, and the like. Further, there is known an image forming apparatus which uses a relational expression that indicates a relationship between a developing bias voltage to be applied to the developing roller and a toner concentration of a predetermined adjustment toner image that is formed by the toner image forming portion, to adjust the developing bias voltage.

SUMMARY

An image forming apparatus according to an aspect of the present disclosure includes a toner image forming portion, a first acquisition processing portion, a second acquisition processing portion, and a third acquisition processing portion. The toner image forming portion forms a toner image. The first acquisition processing portion acquires a toner concentration of a predetermined specific toner image that is formed by the toner image forming portion. The second acquisition processing portion acquires a first toner image forming condition of the toner image forming portion. The third acquisition processing portion acquires, based on the first toner image forming condition acquired by the second acquisition processing portion, a relational expression that indicates a relationship between a second toner image forming condition of the toner image forming portion and the toner concentration. Further, the third acquisition processing portion uses specific expressions that respectively correspond to a plurality of coefficients included in the relational expression to calculate the plurality of coefficients corresponding to the first toner image forming condition acquired by the second acquisition processing portion, the specific expressions each indicating a relationship between one of the plurality of coefficients and the first toner image forming condition.

An image density adjustment method according to another aspect of the present disclosure is executed in an image forming apparatus including a toner image forming portion which forms a toner image and includes a first acquisition step, a second acquisition step, and a third acquisition step. The first acquisition step includes acquiring a toner concentration of a predetermined specific toner image that is formed by the toner image forming portion. The second acquisition step includes acquiring a first toner image forming condition of the toner image forming portion. The third acquisition step includes acquiring, based on the first toner image forming condition acquired in the second acquisition step, a relational expression that indicates a relationship between a second toner image forming condition of the toner image forming portion and the toner concentration. Further, the third acquisition step includes using specific expressions that respectively correspond to a plurality of coefficients included in the relational expression to calculate the plurality of coefficients corresponding to the first toner image forming condition acquired in the second acquisition step, the specific expressions each indicating a relationship between one of the plurality of coefficients and the first toner image forming condition.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a table that shows first relational expressions respectively corresponding to values of toner charge amounts;

DETAILED DESCRIPTION

Hereinafter, embodiments of the present disclosure will be described with reference to the attached drawings. It is noted that the following embodiments are each an example of embodying the present disclosure and do not limit the technical scope of the present disclosure.

Configuration of Image Forming Apparatus 100

First, a configuration of an image forming apparatus 100 according to an embodiment of the present disclosure will be described with reference to FIG. 1 and FIG. 2.

It is noted that for convenience of descriptions, a vertical direction in a state where the image forming apparatus 100 is installed in a usable state (a state shown in FIG. 1) is defined as an up-down direction D1. In addition, a front-rear direction D2 is defined with a left side of a paper surface of the image forming apparatus 100 shown in FIG. 1 being a front surface (front side). In addition, a left-right direction D3 is defined using the front surface of the image forming apparatus 100 in the installed state as a reference.

The image forming apparatus 100 has a printing function for forming an image that is based on image data on a sheet. Specifically, the image forming apparatus 100 is a multi-function peripheral having a plurality of functions such as the printing function, a scanning function, a facsimile function, and a copying function. It is noted that the present disclosure may also be applied to an image forming apparatus capable of forming an image using electrophotography, such as a printer, a facsimile apparatus, and a copying machine.

Figure 1:
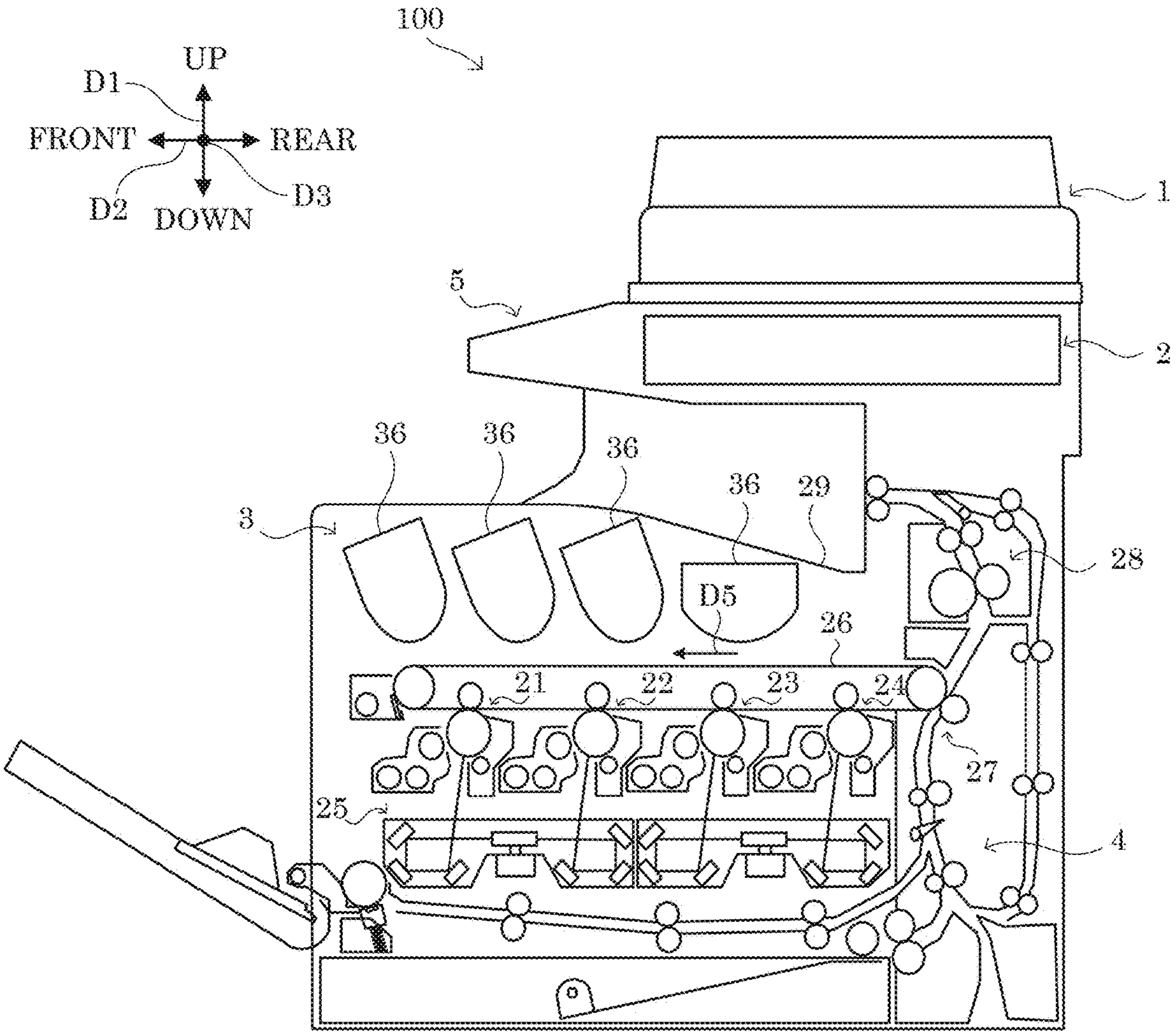
FIG. 1 is a cross-sectional view showing a configuration of an image forming apparatus according to an embodiment of the present disclosure.
Figure 2:
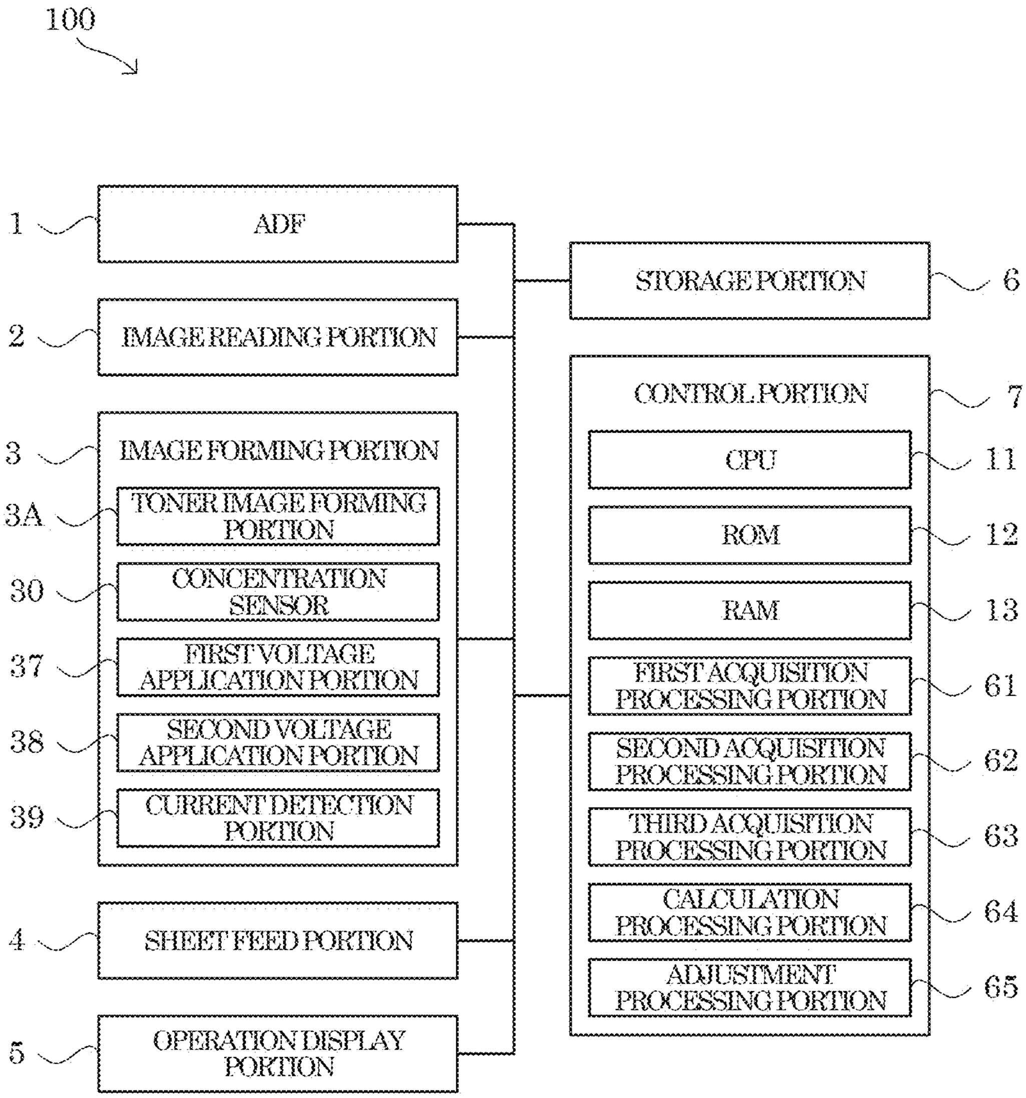
FIG. 2 is a block diagram showing a system configuration of the image forming apparatus according to the embodiment of the present disclosure.

As shown in FIG. 1 and FIG. 2, the image forming apparatus 100 includes an ADF (Auto Document Feeder) 1, an image reading portion 2, an image forming portion 3, a sheet feed portion 4, an operation display portion 5, a storage portion 6, and a control portion 7.

The image reading portion 2 reads an image from a document sheet. The image reading portion 2 includes a document sheet table, a light source, a plurality of mirrors, an optical lens, and a CCD (Charge Coupled Device).

The ADF 1 conveys a document sheet from which an image is to be read by the image reading portion 2. The ADF 1 includes a document sheet setting portion, a plurality of conveying rollers, a document sheet holder, and a sheet discharge portion.

The image forming portion 3 realizes the printing function. Specifically, the image forming portion 3 forms a color or monochrome image on a sheet supplied from the sheet feed portion 4 using electrophotography.

The sheet feed portion 4 supplies sheets to the image forming portion 3. The sheet feed portion 4 includes a sheet feed cassette, a manual feed tray, and a plurality of conveying rollers.

The operation display portion 5 is a user interface of the image forming apparatus 100. The operation display portion 5 includes a display portion and an operation portion. The display portion displays various types of information in response to control instructions from the control portion 7. Specifically, the display portion is a display device such as a liquid crystal display. The operation portion is used to input various types of information to the control portion 7 according to user operations. Specifically, the operation portion is an operation device such as an operation key or a touch panel.

The storage portion 6 is a nonvolatile storage device. For example, the storage portion 6 is a nonvolatile memory such as a flash memory.

The control portion 7 collectively controls the image forming apparatus 100. As shown in FIG. 2, the control portion 7 includes a CPU 11, a ROM 12, and a RAM 13. The CPU 11 is a processor which executes various types of calculation processing. The ROM 12 is a nonvolatile storage device in which information such as control programs for causing the CPU 11 to execute various types of processing is stored in advance. The RAM 13 is a volatile or nonvolatile storage device that is used as a temporary storage memory (working area) for the various types of processing to be executed by the CPU 11. The CPU 11 executes the various control programs stored in advance in the ROM 12 to collectively control the image forming apparatus 100.

It is noted that the control portion 7 may be a control portion provided separate from a main control portion which collectively controls the image forming apparatus 100. Further, the control portion 7 may be configured by an electronic circuit such as an integrated circuit (ASIC).

Configuration of Image Forming Portion 3

Figure 3:
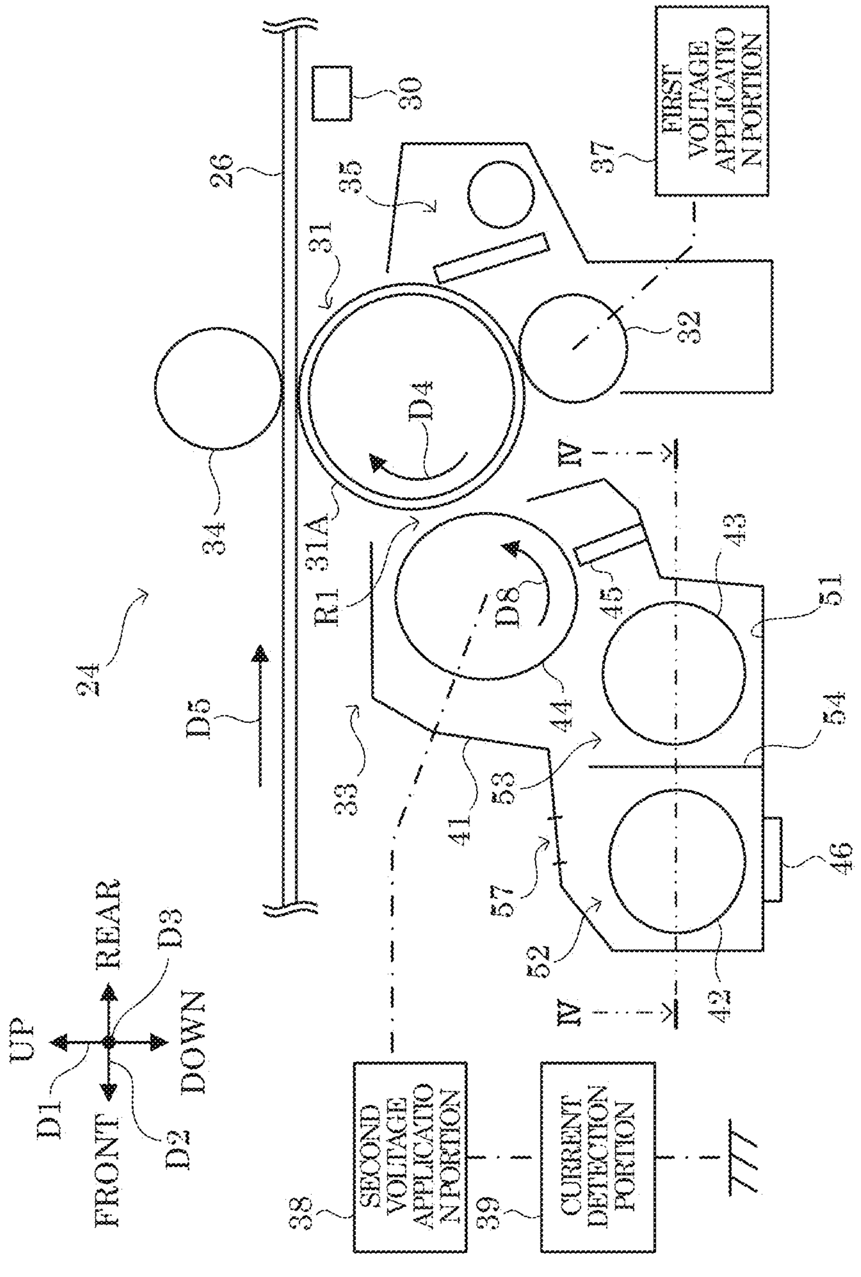
FIG. 3 is a cross-sectional view showing a configuration of an image forming unit of the image forming apparatus according to the embodiment of the present disclosure.

Next, a configuration of the image forming portion 3 will be described with reference to FIG. 1 to FIG. 3. Herein, FIG. 3 is a cross-sectional view showing a configuration of an image forming unit 24. It is noted that in FIG. 3, an energization path between a charging roller 32 and a first voltage application portion 37 and an energization path between a developing roller 44 and the ground are indicated by dash-dot lines.

As shown in FIG. 1, the image forming portion 3 includes a plurality of image forming units 21 to 24, a laser scanning unit 25, an intermediate transfer belt 26, a secondary transfer roller 27, a fixing device 28, and a sheet discharge tray 29. In addition, as shown in FIG. 2 and FIG. 3, the image forming portion 3 includes a concentration sensor 30.

The image forming unit 21 forms a Y (yellow) toner image. The image forming unit 22 forms a C (cyan) toner image. The image forming unit 23 forms an M (magenta) toner image. The image forming unit 24 forms a K (black) toner image. As shown in FIG. 1, the image forming units 21 to 24 are arranged next to one another in the order of yellow, cyan, magenta, and black from the front side of the image forming apparatus 100 along the front-rear direction D2 of the image forming apparatus 100.

As shown in FIG. 3, the image forming unit 24 includes a photoconductor drum 31, the charging roller 32, a developing device 33, a primary transfer roller 34, and a drum cleaning portion 35. Further, the image forming units 21 to 23 have configurations similar to that of the image forming unit 24.

An electrostatic latent image is formed on a surface of the photoconductor drum 31. For example, the photoconductor drum 31 includes a photosensitive layer 31A formed of amorphous silicon. The photoconductor drum 31 rotates in a rotation direction D4 shown in FIG. 3 upon receiving a rotational driving force supplied from a motor (not shown). Thus, the photoconductor drum 31 conveys the electrostatic latent image formed on the surface thereof. It is noted that the photosensitive layer 31A may alternatively be formed of other photosensitized materials such as an organic photosensitized material.

When a preset charging voltage is applied, the charging roller 32 charges the surface of the photoconductor drum 31. For example, the charging roller 32 charges the surface of the photoconductor drum 31 to a positive polarity. The surface of the photoconductor drum 31 charged by the charging roller 32 is irradiated with light that is emitted from the laser scanning unit 25 and is based on image data. Thus, an electrostatic latent image is formed on the surface of the photoconductor drum 31.

The developing device 33 uses developer containing nonmagnetic toner and a magnetic carrier to develop the electrostatic latent image formed on the surface of the photoconductor drum 31. Thus, a toner image is formed on the surface of the photoconductor drum 31.

The primary transfer roller 34 transfers the toner image formed on the surface of the photoconductor drum 31 by the developing device 33 onto the intermediate transfer belt 26.

The drum cleaning portion 35 removes the toner remaining on the surface of the photoconductor drum 31 after the transfer of the toner image by the primary transfer roller 34.

The image forming portion 3 includes toner containers 36 (see FIG. 1) respectively corresponding to the image forming units 21 to 24. In addition, the image forming portion 3 includes the first voltage application portion 37 (see FIG. 2 and FIG. 3), the second voltage application portion 38 (see FIG. 2 and FIG. 3), and a current detection portion 39 (see FIG. 2 and FIG. 3) that correspond to each of the image forming units 21 to 24.

Herein, the toner container 36, the first voltage application portion 37, the second voltage application portion 38, and the current detection portion 39 that correspond to the image forming unit 24 will be described. It is noted that FIG. 2 shows the first voltage application portion 37, the second voltage application portion 38, and the current detection portion 39 that correspond to the image forming unit 24.

The toner container 36 stores the toner of K (black). Further, the toner container 36 supplies the toner of K (black) to the developing device 33. Specifically, a conveying screw which conveys the toner to a discharge port that leads to the outside of the toner container 36 is provided inside the toner container 36. The conveying screw rotates upon receiving a rotational driving force supplied from a motor (not shown) and thus conveys the toner stored inside the toner container 36 to the discharge port. The toner discharged from the discharge port is supplied to the developing device 33 via a supply path (not shown).

The first voltage application portion 37 is a power supply which applies the charging voltage to the charging roller 32. For example, the charging voltage is a DC voltage having a positive polarity.

The second voltage application portion 38 applies a predetermined developing bias voltage to the developing roller 44 of the developing device 33 (see FIG. 3). For example, the developing bias voltage is a voltage containing DC components of a positive polarity and AC components. For example, the developing bias voltage is a rectangular wave and has an amplitude value, a duty ratio, and a frequency set by the control portion 7.

The current detection portion 39 detects a current that flows via the developing roller 44 of the developing device 33 (see FIG. 3). As shown in FIG. 3, the current detection portion 39 is provided in the energization path that reaches the ground from the developing roller 44 via the second voltage application portion 38. For example, the current detection portion 39 includes a resistor and outputs a voltage applied to both ends of the resistor to the control portion 7.

The laser scanning unit 25 forms an electrostatic latent image on the photoconductor drum 31 of each of the image forming units 21 to 24. Specifically, the laser scanning unit 25 emits light that is based on image data toward the surface of the photoconductor drum 31 of each of the image forming units 21 to 24.

The image forming portion 3 includes toner image forming portions 3A (see FIG. 2) respectively corresponding to the image forming units 21 to 24. The toner image forming portion 3A forms a toner image on the photoconductor drum 31. The toner image forming portion 3A includes the laser scanning unit 25, the charging roller 32, and the developing device 33. For example, the toner image forming portion 3A corresponding to the image forming unit 24 includes the laser scanning unit 25 and the charging roller 32 and developing device 33 of the image forming unit 24. It is noted that FIG. 2 shows the toner image forming portion 3A corresponding to the image forming unit 24. The photoconductor drum 31 is an example of an image-carrying member according to the present disclosure. It is noted that the toner image forming portion 3A may alternatively be a member which forms a toner image on the intermediate transfer belt 26 (another example of the image-carrying member according to the present disclosure). In other words, the toner image forming portion 3A may also include the primary transfer roller 34.

The intermediate transfer belt 26 is an endless belt member onto which the toner image formed on the surface of the photoconductor drum 31 of each of the image forming units 21 to 24 is transferred. The intermediate transfer belt 26 is stretched with a predetermined tension by a drive roller and a tension roller. As the drive roller rotates upon receiving a rotational driving force supplied from a motor (not shown), the intermediate transfer belt 26 rotates in a rotation direction D5 shown in FIG. 3.

The secondary transfer roller 27 transfers the toner image that has been transferred onto a surface of the intermediate transfer belt 26 onto a sheet supplied from the sheet feed portion 4.

The fixing device 28 fixes the toner image that has been transferred onto the sheet by the secondary transfer roller 27 onto the sheet.

The sheet onto which the toner image has been fixed by the fixing device 28 is discharged onto the sheet discharge tray 29.

The concentration sensor 30 detects a concentration of a toner image that has been transferred onto an outer circumferential surface of the intermediate transfer belt 26. For example, the concentration sensor 30 is a reflective photosensor including a light-emitting portion that emits light toward the outer circumferential surface of the intermediate transfer belt 26 and a light-receiving portion that receives the light that has been emitted from the light-emitting portion and reflected by the outer circumferential surface of the intermediate transfer belt 26. As shown in FIG. 3, the concentration sensor 30 is arranged more on a downstream side of the rotation direction D5 of the intermediate transfer belt 26 than the image forming unit 24 and more on an upstream side of the rotation direction D5 than the secondary transfer roller 27.

Configuration of Developing Device 33

Next, a configuration of the developing device 33 of the image forming unit 24 will be described with reference to FIG. 3 and FIG. 4. It is noted that the developing devices 33 of the image forming units 21 to 23 have configurations similar to that of the developing device 33 to be described below.

Figure 4:
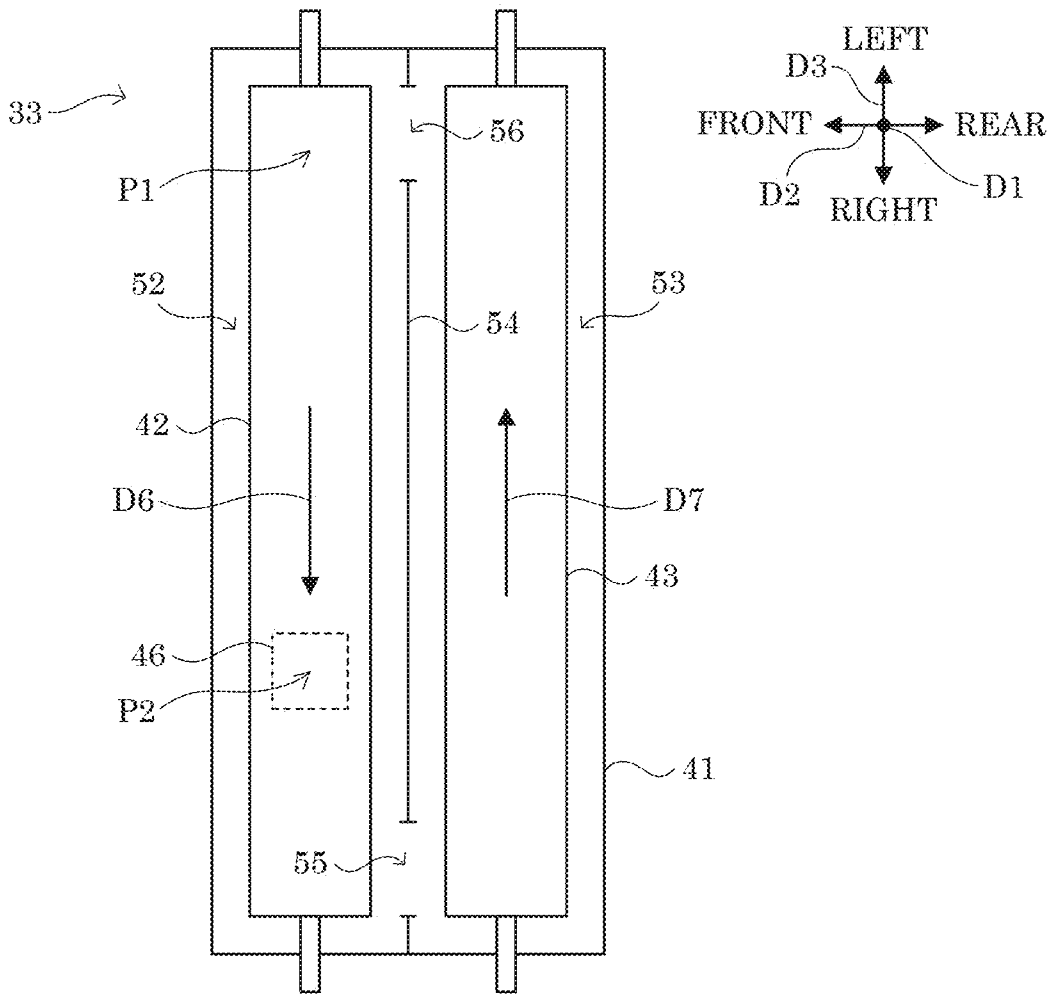
FIG. 4 is a cross-sectional view taken along a line IV-IV indicated by arrows in FIG. 3.

As shown in FIG. 3 and FIG. 4, the developing device 33 includes a housing 41, a first conveying member 42, a second conveying member 43, the developing roller 44, a restriction member 45, and a permeability sensor 46.

As shown in FIG. 3, the housing 41 houses the first conveying member 42, the second conveying member 43, the developing roller 44, and the restriction member 45. In addition, the housing 41 stores the developer containing the toner and the carrier. Specifically, the housing 41 stores the developer in an internal space formed by a bottom surface 51 and side walls erected from the bottom surface 51. The housing 41 is formed to be elongated in the left-right direction D3. The developing device 33 uses the developer stored in the housing 41 to develop the electrostatic latent image formed on the surface of the photoconductor drum 31.

As shown in FIG. 3 and FIG. 4, the housing 41 includes a first conveying path 52 and a second conveying path 53 through which the developer is conveyed. Specifically, a partition wall 54 (see FIG. 4) that extends in the left-right direction D3 is provided on the bottom surface 51 of the housing 41. The first conveying path 52 and the second conveying path 53 that extend in the left-right direction D3 are formed by the bottom surface 51, side walls, and partition wall 54 of the housing 41.

The first conveying member 42 is rotatably provided in the housing 41. As shown in FIG. 4, the first conveying member 42 is provided in the first conveying path 52. The first conveying member 42 conveys the developer stored in the first conveying path 52 in a conveying direction D6 shown in FIG. 4. Moreover, the first conveying member 42 stirs the developer to frictionally charge the toner and the carrier. For example, the toner is charged to a positive polarity by the frictional charge with the carrier. For example, the first conveying member 42 is a screw-like member that is provided while being rotatable about a rotation shaft provided along the left-right direction D3 in the first conveying path 52. The first conveying member 42 rotates upon receiving a rotational driving force supplied from a motor (not shown). It is noted that the first conveying member 42 is not limited to the screw-like member and only needs to be a member capable of stirring and conveying the developer.

The second conveying member 43 is rotatably provided in the housing 41. As shown in FIG. 4, the second conveying member 43 is provided in the second conveying path 53. The second conveying member 43 conveys the developer stored in the second conveying path 53 in a conveying direction D7 shown in FIG. 4. Moreover, the second conveying member 43 stirs the developer to frictionally charge the toner and the carrier. For example, the second conveying member 43 is a screw-like member that is provided while being rotatable about a rotation shaft provided along the left-right direction D3 in the second conveying path 53. The second conveying member 43 rotates upon receiving a rotational driving force supplied from a motor (not shown). It is noted that the second conveying member 43 is not limited to the screw-like member and only needs to be a member capable of stirring and conveying the developer.

As shown in FIG. 4, a first path 55 that leads to the second conveying path 53 is provided at an end portion of the first conveying path 52 on the downstream side of the conveying direction D6. For example, the first path 55 is formed at a right end portion of the partition wall 54. Further, as shown in FIG. 4, a second path 56 that leads to the first conveying path 52 is provided at an end portion of the second conveying path 53 on the downstream side of the conveying direction D7. For example, the second path 56 is formed at a left end portion of the partition wall 54. In other words, inside the housing 41, a circulation conveying path through which the developer circulates is formed by the first conveying path 52, the first path 55, the second conveying path 53, and the second path 56.

The developing roller 44 is provided opposed to the photoconductor drum 31. The developing roller 44 conveys the developer stored in the housing 41 to an opposing region R1 (see FIG. 3) between the developing roller 44 and the photoconductor drum 31. The developing bias voltage is applied to the developing roller 44. The developing roller 44 uses the toner to develop the electrostatic latent image formed on the photoconductor drum 31. The developing roller 44 is an example of a developing member according to the present disclosure.

As shown in FIG. 3, the developing roller 44 is provided opposed to the second conveying member 43 and the photoconductor drum 31. The developing roller 44 draws the developer from the second conveying path 53. The developer drawn by the developing roller 44 forms a magnetic brush on the outer circumferential surface of the developing roller 44 by a magnetic force of a magnetic pole provided inside the developing roller 44.

The developing roller 44 is rotatably supported by the housing 41 and rotates in a rotation direction D8 shown in FIG. 3 upon receiving a rotational driving force supplied from a motor (not shown). Thus, the developing roller 44 conveys the magnetic brush formed on the outer circumferential surface thereof to the opposing region R1 (see FIG. 3).

By the rotation of the photoconductor drum 31, the electrostatic latent image formed on the surface of the photoconductor drum 31 is conveyed to the opposing region R1. Herein, the electrostatic latent image formed on the surface of the photoconductor drum 31 includes a visible region visualized by the toner and an invisible region that is not visualized by the toner. The visible region is a region on the surface of the photoconductor drum 31 that has been irradiated with the light emitted from the laser scanning unit 25. Further, the invisible region is a region on the surface of the photoconductor drum 31 that has not been irradiated with the light emitted from the laser scanning unit 25.

When the developing bias voltage is applied to the developing roller 44, a first electric field for causing the toner to move to the photoconductor drum 31 side is formed between the developing roller 44 and the visible region. In addition, when the developing bias voltage is applied to the developing roller 44, a second electric field for causing the toner to move to the developing roller 44 side is formed between the developing roller 44 and the invisible region. The toner contained in the magnetic brush conveyed to the opposing region R1 is selectively moved to the visible region out of the electrostatic latent image formed on the surface of the photoconductor drum 31 by actions of the first electric field and the second electric field formed in the opposing region R1. Thus, the electrostatic latent image formed on the surface of the photoconductor drum 31 is developed (visualized).

It is noted that the visible region may alternatively be a region on the surface of the photoconductor drum 31 that has not been irradiated with the light emitted from the laser scanning unit 25. In this case, the invisible region may be a region on the surface of the photoconductor drum 31 that has been irradiated with the light emitted from the laser scanning unit 25. Alternatively, the invisible region may be a region on the surface of the photoconductor drum 31 that has not been charged by the charging roller 32. When the visible region is the region on the surface of the photoconductor drum 31 that has not been irradiated with the light emitted from the laser scanning unit 25, the toner is charged to a reverse polarity from the charging polarity by the charging roller 32.

The restriction member 45 restricts a layer thickness of the magnetic brush formed on the outer circumferential surface of the developing roller 44. As shown in FIG. 3, the restriction member 45 is provided more on the downstream side of the rotation direction D8 than an opposing region between the second conveying member 43 and the developing roller 44 and more on the upstream side of the rotation direction D8 than the opposing region R1. The restriction member 45 is provided opposed to the outer circumferential surface of the developing roller 44 such that a predetermined gap is formed between the restriction member 45 and the outer circumferential surface of the developing roller 44.

An opening portion 57 is provided on an upper side of the first conveying path 52. As shown in FIG. 3, the opening portion 57 is provided at an upper surface portion of the housing 41 that covers the first conveying path 52 on the upper side of the first conveying path 52. The opening portion 57 is provided opposed to an end portion of the first conveying path 52 on the upstream side of the conveying direction D6. The opening portion 57 is used for carrying in the toner supplied from the toner container 36 to the first conveying path 52. Specifically, the toner supplied from the toner container 36 is carried to an entrance position P1 (see FIG. 4) of the first conveying path 52 via the opening portion 57. The entrance position P1 is an opposing position with respect to the opening portion 57 on the bottom surface 51.

The permeability sensor 46 detects a permeability of the developer stored in the housing 41. Specifically, the permeability sensor 46 detects the permeability of the developer at a detection position P2 (see FIG. 4) that is more on the downstream side of the conveying direction D6 than the entrance position P1 in the first conveying path 52. As shown in FIG. 3, the permeability sensor 46 is provided at a bottom surface portion of the housing 41. The permeability sensor 46 outputs an electric signal of a voltage corresponding to the detected permeability of the developer.

Incidentally, there is known an image forming apparatus which uses a first relational expression that indicates a relationship between a DC component of the developing bias voltage that is applied to the developing roller 44 and a toner concentration of a predetermined adjustment toner image that is formed by the toner image forming portion 3A, to adjust the DC component of the developing bias voltage.

Figure 5:
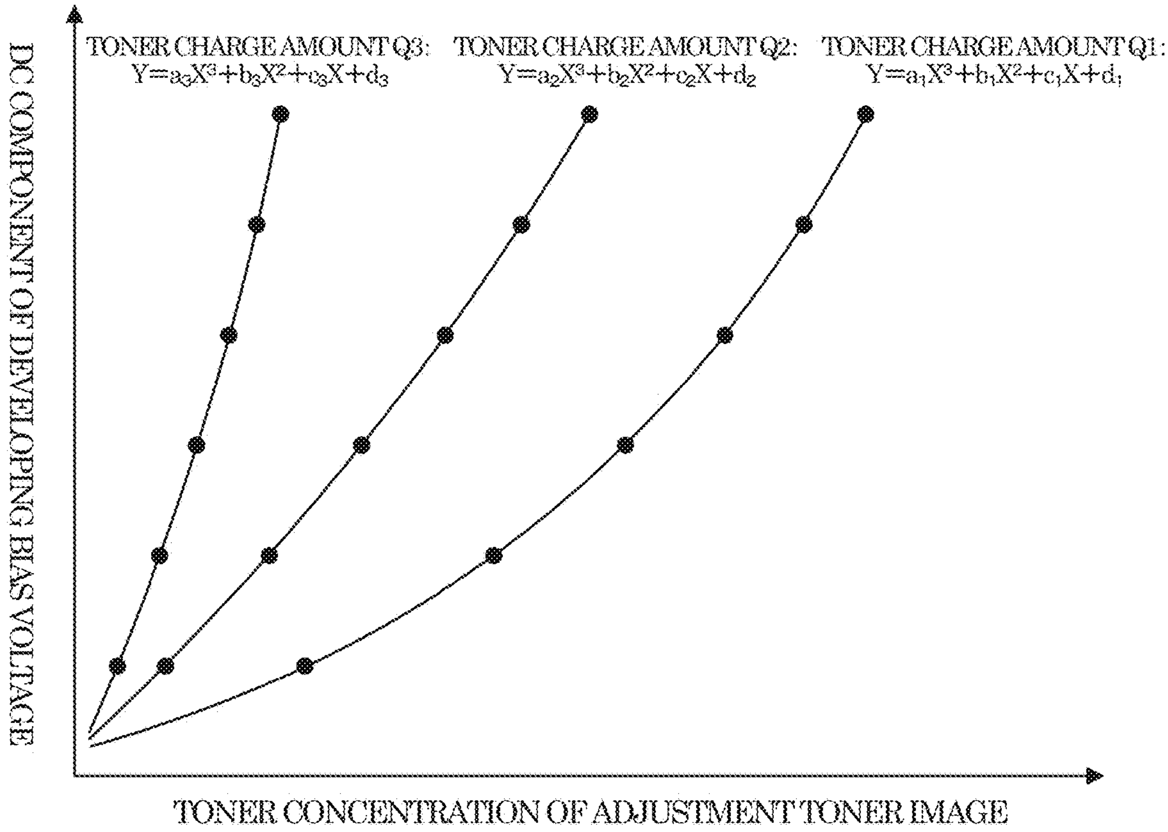
FIG. 5 is a graph showing a relationship between a toner concentration of an adjustment toner image and a DC component of a developing bias voltage.

Herein, as shown in FIG. 5, the first relational expression that indicates the relationship between the DC component of the developing bias voltage and the toner concentration of the adjustment toner image varies according to a charge amount of the toner used for forming the adjustment toner image. FIG. 5 is a graph showing a first relational expression ($Y=a_1X^3+b_1X^2+c_1X+d_1$) corresponding to a toner charge amount Q1, a first relational expression ($Y=a_2X^3+b_2X^2+c_2X+d_2$) corresponding to a toner charge amount Q2 larger than the toner charge amount Q1, and a first relational expression ($Y=a_3X^3+b_3X^2+c_3X+d_3$) corresponding to a toner charge amount Q3 larger than the toner charge amount Q2. For example, the first relational expression is a cubic formula. It is noted that the first relational expression is not limited to the cubic formula and may alternatively be a quadratic expression or a high order expression of quartic or more.

Therefore, by acquiring the first relational expression corresponding to the current value of the toner charge amount and adjusting the DC component of the developing bias voltage using the acquired first relational expression, adjustment accuracy of the developing bias voltage can be improved.

However, when a large number of the first relational expressions corresponding to a large number of values, that each indicate the toner charge amount as in the table shown in FIG. 6 are to be retained in the image forming apparatus 100 for acquiring the first relational expression corresponding to the current value of the toner charge amount, a data retention amount of the image forming apparatus 100 increases.

In contrast, in the image forming apparatus 100 according to the embodiment of the present disclosure, it is possible to improve the adjustment accuracy of the developing bias voltage as well as suppress an increase of the data retention amount as will be described below.

Configuration of Control Portion 7

Next, a configuration of the control portion 7 will be described with reference to FIG. 2.

As shown in FIG. 2, the control portion 7 includes a first acquisition processing portion 61, a second acquisition processing portion 62, a third acquisition processing portion 63, a calculation processing portion 64, and an adjustment processing portion 65.

Specifically, a toner image forming condition adjustment program for causing the CPU 11 to function as the respective processing portions described above is stored in advance in the ROM 12 of the control portion 7. Then, the CPU 11 executes the toner image forming condition adjustment program stored in the ROM 12 to function as the respective processing portions described above. It is noted that some or all of the processing portions included in the control portion 7 may be configured by an electronic circuit. Alternatively, the toner image forming condition adjustment program may be a program for causing a plurality of processors to function as the respective processing portions included in the control portion 7.

It is noted that descriptions below will be given while taking the respective portions included in the image forming unit 24 out of the image forming units 21 to 24 and the respective portions provided in correspondence with the image forming unit 24 as an example. In the descriptions below, the same holds true for each of the image forming units 21 to 23.

The first acquisition processing portion 61 acquires a toner concentration of the adjustment toner image formed by the toner image forming portion 3A. The adjustment toner image is an example of a specific toner image according to the present disclosure.

For example, the adjustment toner image is a band-like toner image that is elongated in a width direction of the photoconductor drum 31 (an extension direction of a rotation shaft of the photoconductor drum 31).

For example, the first acquisition processing portion 61 uses the concentration sensor 30 to acquire the toner concentration of the adjustment toner image that has been formed on the surface of the photoconductor drum 31 by the toner image forming portion 3A and transferred onto the surface of the intermediate transfer belt 26 by the primary transfer roller 34. Herein, the toner concentration indicates a load amount (weight) of the toner on the intermediate transfer belt 26 or a density of an image formed by the toner.

It is noted that the adjustment toner image is not limited to the bank-like toner image elongated in the width direction of the photoconductor drum 31, and may be a toner image of any shape.

Alternatively, the image forming portion 3 may include a sensor capable of detecting a concentration of a toner image formed on the surface of the photoconductor drum 31. In this case, the first acquisition processing portion 61 only needs to use the sensor to acquire the toner concentration of the adjustment toner image formed on the surface of the photoconductor drum 31 by the toner image forming portion 3A.

The second acquisition processing portion 62 acquires a first toner image forming condition of the toner image forming portion 3A.

Specifically, the first toner image forming condition is the toner charge amount.

For example, the second acquisition processing portion 62 acquires the toner charge amount based on a developing current that flows during development of the adjustment toner image and the toner concentration of the adjustment toner image acquired by the first acquisition processing portion 61.

Specifically, the second acquisition processing portion 62 calculates an amount of the toner used for developing the adjustment toner image based on the toner concentration of the adjustment toner image acquired by the first acquisition processing portion 61. Then, the second acquisition processing portion 62 divides the developing current by the amount of the toner used for developing the adjustment toner image, to thus calculate the toner charge amount.

For example, the second acquisition processing portion 62 uses the current detection portion 39 to detect the developing current that flows via the developing roller 44 during the development of the adjustment toner image. Herein, as the adjustment toner image is elongated more in the width direction of the photoconductor drum 31, the current that is contained in the current detected by the current detection portion 39 and flows on both outer sides of the adjustment toner image in the width direction reduces. Therefore, acquisition accuracy of the toner charge amount is improved.

It is noted that the second acquisition processing portion 62 may acquire the toner charge amount for each of a plurality of adjustment toner images and acquire an average value of the plurality of acquired toner charge amounts.

Moreover, the acquisition method of the toner charge amount carried out by the second acquisition processing portion 62 is not limited to the method described above, and other known methods may be used instead.

The third acquisition processing portion 63 acquires a relational expression that indicates a relationship between a second toner image forming condition of the toner image forming portion 3A and the toner concentration based on the first toner image forming condition acquired by the second acquisition processing portion 62.

Further, the third acquisition processing portion 63 uses specific expressions that respectively correspond to a plurality of coefficients included in the relational expression to calculate the plurality of coefficients corresponding to the first toner image forming condition acquired by the second acquisition processing portion 62, the specific expressions each indicating a relationship between the coefficient and the first toner image forming condition.

Specifically, the second toner image forming condition is the developing bias voltage. In other words, the third acquisition processing portion 63 acquires the first relational expression corresponding to the toner charge amount based on the toner charge amount acquired by the second acquisition processing portion 62.

Figure 7:
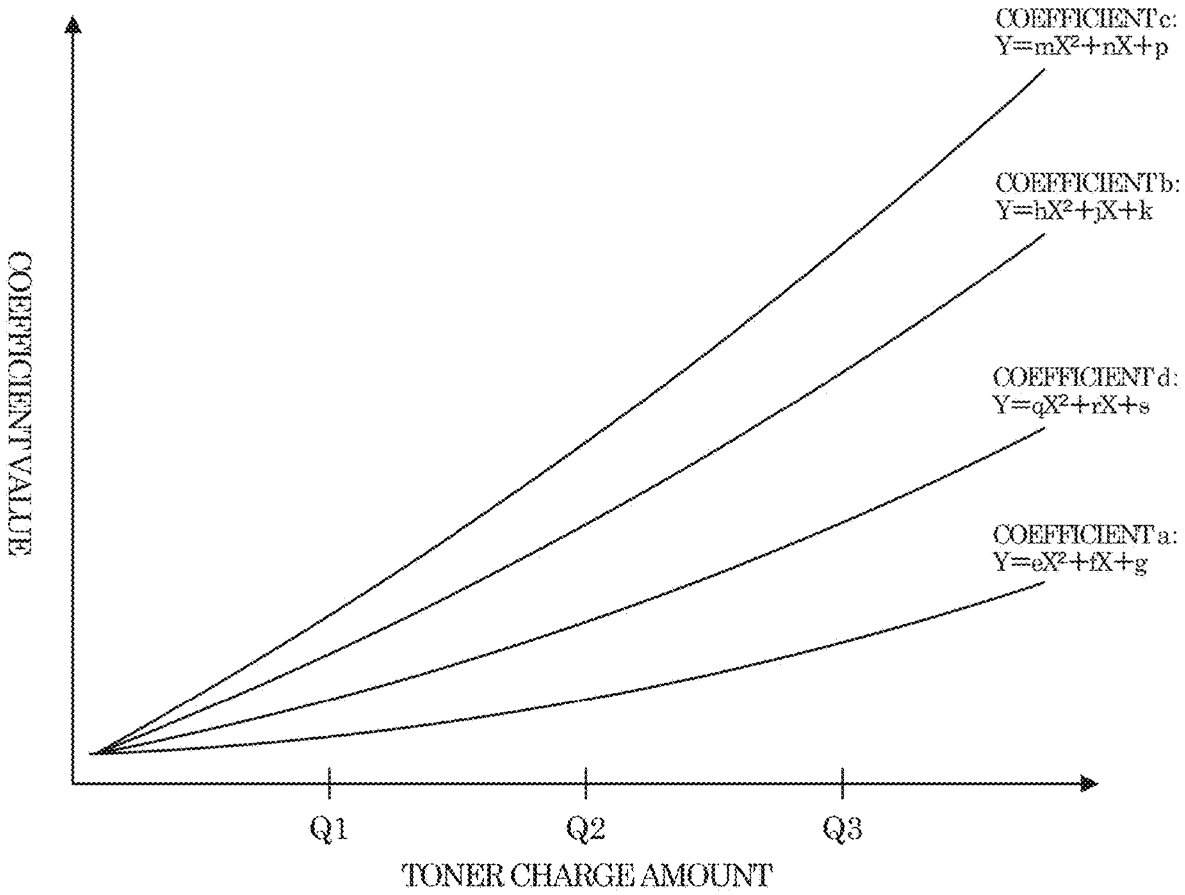
FIG. 7 is a graph showing relationships between the toner charge amount and values of coefficients included in the first relational expression.

FIG. 7 shows the specific expressions respectively corresponding to a coefficient a, a coefficient b, a coefficient c, and a coefficient d that are included in the first relational expressions (cubic formulae) shown in FIG. 6. Herein, the coefficient a is a coefficient of a unary expression whose degree included in the first relational expression is 3. Further, the coefficient b is a coefficient of a unary expression whose degree included in the first relational expression is 2. Furthermore, the coefficient c is a coefficient of a unary expression whose degree included in the first relational expression is 1. Moreover, the coefficient d is a coefficient of a unary expression whose degree included in the first relational expression is 0, that is, a constant term.

The specific expression shown in FIG. 7 that corresponds to the coefficient a is "$Y=eX^2+fX+g$". Further, the specific expression that corresponds to the coefficient b is "$Y=hX^2+jX+k$". Furthermore, the specific expression that corresponds to the coefficient c is "$Y=mX^2+nX+p$". Moreover, the specific expression that corresponds to the coefficient d is "$Y=qX^2+rX+s$".

The specific expression that corresponds to the coefficient a can be calculated based on a value of the coefficient a for each of the toner charge amounts in the table shown in FIG. 6. Further, the specific expression that corresponds to the coefficient b can be calculated based on a value of the coefficient b for each of the toner charge amounts in the table shown in FIG. 6. Furthermore, the specific expression that corresponds to the coefficient c can be calculated based on a value of the coefficient c for each of the toner charge amounts in the table shown in FIG. 6. Moreover, the specific expression that corresponds to the coefficient d can be calculated based on a value of the coefficient d for each of the toner charge amounts in the table shown in FIG. 6.

For example, the table shown in FIG. 6 can be acquired using a learning model (artificial intelligence) that has been learned based on training data including the toner charge amount, the DC component of the developing bias voltage, and the toner concentration of the adjustment toner image. Alternatively, the table shown in FIG. 6 may be acquired based on a result of an experiment that uses the image forming apparatus 100, for researching a relationship among the toner charge amount, the DC component of the developing bias voltage, and the toner concentration of the adjustment toner image.

Data indicating the specific expressions respectively corresponding to the coefficient a, the coefficient b, the coefficient c, and the coefficient d is stored in advance in the storage portion 6 of the image forming apparatus 100. Thus, the third acquisition processing portion 63 can calculate each of the coefficients included in the first relational expression corresponding to the toner charge amount based on the toner charge amount acquired by the second acquisition processing portion 62. In other words, the third acquisition processing portion 63 can acquire the first relational expression corresponding to the current value of the toner charge amount without using the table shown in FIG. 6.

The calculation processing portion 64 uses the relational expression acquired by the third acquisition processing portion 63 to calculate the second toner image forming condition corresponding to the toner concentration acquired by the first acquisition processing portion 61.

The adjustment processing portion 65 adjusts the second toner image forming condition based on the second toner image forming condition calculated by the calculation processing portion 64.

Toner Image Forming Condition Adjustment Processing

Figure 8:
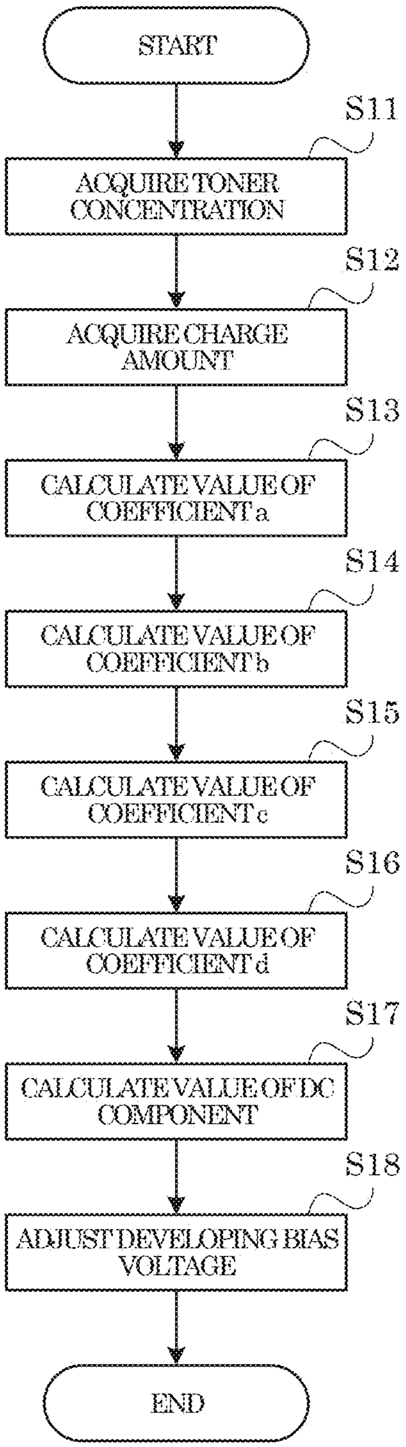
FIG. 8 is a flowchart showing an example of toner image forming condition adjustment processing executed in the image forming apparatus according to the embodiment of the present disclosure.

Hereinafter, an image density adjustment method according to the present disclosure will be described with reference to FIG. 8 along with exemplary procedures of toner image forming condition adjustment processing executed by the control portion 7 in the image forming apparatus 100. Herein, S11, S12, . . . represent number of processing procedures (steps) executed by the control portion 7.

For example, the toner image forming condition adjustment processing is executed when the power supply of the image forming apparatus 100 is turned on and when an operation mode of the image forming apparatus 100 is shifted from a power-saving mode in which power consumption is lower than that of a normal mode to the normal mode. Alternatively, the toner image forming condition adjustment processing may be executed every time a cumulative value of the number of output printed materials output by the image forming apparatus 100 reaches a multiple number of a predetermined reference number.

Step S11

First, in Step S11, the control portion 7 acquires the toner concentration of the adjustment toner image formed by the toner image forming portion 3A. Herein, the processing of Step S11 is an example of a first acquisition step according to the present disclosure and is executed by the first acquisition processing portion 61 of the control portion 7.

Specifically, the control portion 7 controls operations of the image forming portion 3 to cause the adjustment toner image to be formed on the surface of the photoconductor drum 31 of the image forming unit 24 and cause the adjustment toner image to be transferred onto the surface of the intermediate transfer belt 26. Then, the control portion 7 uses the concentration sensor 30 to acquire the toner concentration of the adjustment toner image that has been transferred onto the surface of the intermediate transfer belt 26.

Step S12

In Step S12, the control portion 7 acquires the toner charge amount. Herein, the processing of Step S12 is an example of a second acquisition step according to the present disclosure and is executed by the second acquisition processing portion 62 of the control portion 7.

Specifically, while executing the processing of Step S11, the control portion 7 uses the current detection portion 39 to detect the developing current that flows during development of the adjustment toner image. Further, the control portion 7 calculates an amount of the toner used for developing the adjustment toner image based on the toner concentration of the adjustment toner image acquired by the processing of Step S11. Then, the control portion 7 divides the detected developing current by the amount of the toner used for developing the adjustment toner image, to thus calculate the toner charge amount.

Step S13

In Step S13, the control portion 7 calculates the value of the coefficient a included in the first relational expression that indicates the relationship between the DC component of the developing bias voltage and the toner concentration of the adjustment toner image based on the toner charge amount acquired by the processing of Step S12.

Specifically, the control portion 7 calculates the value of the coefficient a by substituting the toner charge amount acquired by the processing of Step S12 into the specific expression corresponding to the coefficient a (see FIG. 7) that is stored in the storage portion 6.

Step S14

In Step S14, the control portion 7 calculates the value of the coefficient b included in the first relational expression based on the toner charge amount acquired by the processing of Step S12.

Specifically, the control portion 7 calculates the value of the coefficient b by substituting the toner charge amount acquired by the processing of Step S12 into the specific expression corresponding to the coefficient b (see FIG. 7) that is stored in the storage portion 6.

Step S15

In Step S15, the control portion 7 calculates the value of the coefficient c included in the first relational expression based on the toner charge amount acquired by the processing of Step S12.

Specifically, the control portion 7 calculates the value of the coefficient c by substituting the toner charge amount acquired by the processing of Step S12 into the specific expression corresponding to the coefficient c (see FIG. 7) that is stored in the storage portion 6.

Step S16

In Step S16, the control portion 7 calculates the value of the coefficient d included in the first relational expression based on the toner charge amount acquired by the processing of Step S12.

Specifically, the control portion 7 calculates the value of the coefficient d by substituting the toner charge amount acquired by the processing of Step S12 into the specific expression corresponding to the coefficient d (see FIG. 7) that is stored in the storage portion 6.

By executing the processing of Step S13 to Step S16, the first relational expression corresponding to the value of the toner charge amount acquired by the processing of Step S12 is acquired. Herein, the processing of Step S13 to Step S16 is an example of a third acquisition step according to the present disclosure and is executed by the third acquisition processing portion 63 of the control portion 7.

Step S17

In Step S17, the control portion 7 uses the first relational expression acquired by the processing of Step S13 to Step S16 to calculate a value of the DC component of the developing bias voltage corresponding to the toner concentration acquired by the processing of Step S11.

Specifically, the control portion 7 substitutes the toner concentration acquired by the processing of Step S11 into the first relational expression acquired by the processing of Step S13 to Step S16, to calculate the value of the DC component of the developing bias voltage.

Step S18

In Step S18, the control portion 7 adjusts the DC component of the developing bias voltage based on the value of the DC component of the developing bias voltage calculated by the processing of Step S17.

For example, the control portion 7 sets the DC component of the developing bias voltage within a predetermined range including the value calculated by the processing of Step S17.

In this manner, in the image forming apparatus 100, the specific expressions respectively corresponding to the plurality of coefficients included in the first relational expression are used to calculate the plurality of coefficients corresponding to the toner charge amount. Thus, the first relational expression corresponding to the current value of the toner charge amount can be acquired without having to retain a large number of the first relational expressions corresponding to a large number of values as in the table shown in FIG. 6, that each indicate the toner charge amount, in the image forming apparatus 100. Accordingly, it is possible to improve the adjustment accuracy of the developing bias voltage as well as suppress an increase of the data retention amount.

Other Embodiments

Incidentally, there is known an image forming apparatus which uses a second relational expression that indicates a relationship between a light amount of the light emitted from the laser scanning unit 25 and the toner concentration of the adjustment toner image formed by the toner image forming portion 3A, to thus adjust the light amount of the light emitted from the laser scanning unit 25. For example, the second relational expression is a cubic formula.

Herein, the second relational expression varies according to the DC component of the developing bias voltage. Therefore, by acquiring the second relational expression corresponding to the current value of the DC component of the developing bias voltage and adjusting the light amount of the light emitted from the laser scanning unit 25 using the acquired second relational expression, adjustment accuracy of the light amount of the light can be improved.

However, when a large number of the second relational expressions corresponding to a large number of values, that each indicate the DC component of the developing bias voltage, are to be retained in the image forming apparatus 100 for acquiring the second relational expression corresponding to the current value of the DC component of the developing bias voltage, the data retention amount of the image forming apparatus 100 increases.

In contrast, in the image forming apparatus 100 according to another embodiment of the present disclosure, it is possible to improve the adjustment accuracy of the light amount of the light emitted from the laser scanning unit 25 as well as suppress an increase of the data retention amount as will be described below.

Specifically, in the image forming apparatus 100 according to another embodiment of the present disclosure, the second toner image forming condition is the light amount of the light emitted from the laser scanning unit 25, and the first toner image forming condition is the developing bias voltage.

Further, the second acquisition processing portion 62 acquires the developing bias voltage. Specifically, the second acquisition processing portion 62 acquires a current setting value of the DC component of the developing bias voltage.

Furthermore, the third acquisition processing portion 63 acquires the second relational expression corresponding to the developing bias voltage based on the developing bias voltage acquired by the second acquisition processing portion 62.

More specifically, the third acquisition processing portion 63 uses the specific expressions that respectively correspond to the plurality of coefficients included in the second relational expression to calculate the plurality of coefficients corresponding to the developing bias voltage acquired by the second acquisition processing portion 62, the specific expressions each indicating a relationship between the coefficient and the DC component of the developing bias voltage.

It is noted that the specific expressions that respectively correspond to the plurality of coefficients included in the second relational expression can be calculated based on a table that shows a large number of the second relational expressions corresponding to a large number of values, that each indicate the DC component of the developing bias voltage. Further, the table can be acquired using a learning model (artificial intelligence) that has been learned based on training data including the DC component of the developing bias voltage, the light amount of the light emitted from the laser scanning unit 25, and the toner concentration of the adjustment toner image.

Thus, it is possible to improve the adjustment accuracy of the light amount of the light emitted from the laser scanning unit 25 without having to retain a large number of the second relational expressions corresponding to a large number of values, that each indicate the DC component of the developing bias voltage, in the image forming apparatus 100.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a toner image forming portion including at least a developing member which develops an electrostatic latent image formed on an image-carrying member using toner and configured to form a toner image; and a processor, wherein the processor functions as:

a first acquisition processing portion which acquires a toner concentration of a predetermined specific toner image that is formed by the toner image forming portion;

a second acquisition processing portion which acquires a first toner image forming condition of the toner image forming portion; and a third acquisition processing portion which acquires, based on the first toner image forming condition acquired by the second acquisition processing portion, a relational expression configured for calculating a second toner image forming condition of the toner image forming portion by substituting the toner concentration into the relational expression, wherein the third acquisition processing portion uses specific expressions that respectively correspond to a plurality of coefficients included in the relational expression to calculate the plurality of coefficients corresponding to the first toner image forming condition acquired by the second acquisition processing portion, the specific expressions each indicating a relationship between one of the plurality of coefficients and the first toner image forming condition.

2. The image forming apparatus according to claim 1, wherein the first toner image forming condition is a charge amount of the toner, and the second toner image forming condition is a developing bias voltage to be applied to the developing member.

3. The image forming apparatus according to claim 1, wherein the toner image forming portion includes a laser scanning unit which forms an electrostatic latent image on the image-carrying member, the first toner image forming condition is a developing bias voltage to be applied to the developing member, and the second toner image forming condition is a light amount of light emitted by the laser scanning unit.

4. An image density adjustment method executed in an image forming apparatus including a toner image forming portion including at least a developing member which develops an electrostatic latent image formed on an image-carrying member using toner and configured to form a toner image, comprising:

a first acquisition step of acquiring a toner concentration of a predetermined specific toner image that is formed by the toner image forming portion;

a second acquisition step of acquiring a first toner image forming condition of the toner image forming portion; and a third acquisition step of acquiring, based on the first toner image forming condition acquired in the second acquisition step, a relational expression capable of calculating a second toner image forming condition of the toner image forming portion by substituting the toner concentration into the relational expression, wherein the third acquisition step includes using specific expressions that respectively correspond to a plurality of coefficients included in the relational expression to calculate the plurality of coefficients corresponding to the first toner image forming condition acquired in the second acquisition step, the specific expressions each indicating a relationship between one of the plurality of coefficients and the first toner image forming condition.

* * * * *